United States Patent Office 3,391,988
Patented July 9, 1968

3,391,988
PROCESS FOR THE REMOVAL OF
MERCAPTANS FROM GASES
Herbert Friess, Gladbeck, Germany, assignor to Gelsenberg Benzin Aktiengesellschaft, Gelsenkirchen-Horst, Germany, a corporation of Germany
No Drawing. Filed Dec. 24, 1964, Ser. No. 421,075
Claims priority, application Italy, July 10, 1964,
Patent 731,334
8 Claims. (Cl. 23—2)

ABSTRACT OF THE DISCLOSURE

Method of removing mercaptans from gases containing oxygen comprising contacting said gases with an adsorbent which has been impregnated with an alkaline liquid containing a thickening agent such as starch to convert the mercaptans to disulfides and thereafter removing the disulfides from the gases by absorption.

---

This invention relates to a process for removing mercaptans from gases, and more particularly to removal of mercaptans from gases containing carbon monoxide.

Due to the foul odor of mercaptans, it is commonly a requirement in industry that such compounds be removed from exhaust gases. For example, in the production of gasoline, it is common to treat the gasoline to remove mercaptans therefrom. This results in a gaseous or liquid waste material containing the mercaptans and a problem arises with respect to disposal of the waste material.

The intensity of the odor of mercaptans is extraordinarily great. Concentration data given in the literature as to the amount of mercaptans which can just barely be sensed are not entirely in agreement on account of the subjective nature of the sense of smell. But the reported values indicate the order of significant concentration. Ethyl mercaptan is said to be clearly detectable by odor in a dilution of $1:10^{11}$ (Chemisches Zentralblatt, 1936, p. 4178). Even a dilution of $1:10^{12}$ is considered as clearly perceptible ("Gas- und Wasserfach," 74 p. 248 (1931)). In any case, the high degree of dilution in which mercaptans can be smelled is surprising. For this reason, proposals have repeatedly been made for odorizing industrial gases, such as illuminating gas ("Monatsbulletin des Schweizer Vereins von Gas- und Wasser-Fachmannern," 37, pp. 97 sqq. (1957), "Bull. Soc. Pharm. Bordeaux" 1958, 97, pp. 58 sqq.) and water gas (Henglein, "Grundriss der Chemie und Technik," 4th and 5th ed., 1949, p. 310), which are, of course, free of mercaptans, with very small quantities of the sulfur compounds.

A process has also been described for removing from industrial gases such as water gas or illuminating gas, sulfur compounds contained therein. The following are named as such sulfur compounds: COS, $CS_2$ and thiophene. The purposes of these processes is to desulfurize the industrial gases. They operate in one stage and some of them use very specific, selected active charcoals (German Patents 708,933, 355,191 and 702,605). The desulfuration of gases which contain mercaptans, however, cannot be achieved by this method, since the mercaptans are transformed into disulfides which are not at all adsorbed by alkalinized active charcoals or are adsorbed to such a limited extent that the escaping gas remains sulfurous.

The mercaptans are especially unpleasant when they occur in exhaust gases which escape freely to the atmosphere. It is true that it is possible to burn mercaptanous exhaust gases directly, or to flash them off with heating gas, with the addition of air under certain circumstances, and thereby transforming the mercaptan sulful into sulfur dioxide. However, the conditions required for this are not always present.

A process has already been described for purifying from air odorous substances produced by the rotting or decomposition of animal or vegetable proteins (U.S. Pat. 1,738,-543). According to this process, iron hydroxide is formed of iron sulfate and calcium hydroxide in the aqueous phase and simultaneously precipitated onto marl. This system, in the form of a suspension, is brought into contact with the air that is to be purified in a counterflow produced in a diffuser system. In this reaction, the odorous substances are so transposed that the escaping air is odor-free. These odorous substances include mercaptans. In the transposition of the mercaptans, special compounds are formed with iron hydroxide. This process, therefore, operates in one stage and in the liquid phase. Very slight amounts of mercaptans occur in the decomposition of animal or vegetable proteins. This is an important condition for the applicability of the known process, because otherwise the life of the active substance would not be adequate. If industrial exhaust gases containing large amounts of mercaptans are used, the active substance would be exhausted too rapidly. Further, no disulfides form in the reaction, so that a winning of disulfides as a valuable by-product of the process is impossible.

The inventor previously has stated (see German Patent Specification 1,144,692) that it is possible to remove mercaptans from exhaust gases by contacting said gases in presence of free oxygen at temperatures under 100° C. with solid adsorbents such as active charcoal, pumice, cokes, clay shards, bauxite or bog-iron ores impregnated with alkalinely reacting inorganic compounds or their solutions and by then contacting the effluent gas with an adsorbent for disulfides for removal of said disulfides from the gas.

It is the main object of the invention to improve this method. Especially, it is an object to increase this time of effectiveness of the contact substances. Another object is a decrease of the consumption of the alkalinely reacting agent.

The subject of the invention is a process in which the mercaptans contained in exhaust gases are, at a temperature under 100° C. and in the presence of some free oxygen, with a solid absorbent impregnated with a liquid mixture of an alkaline material for chemical conversion of mercaptans in the gas to disulfides and a thickening agent and then contacting the effluent gas with an adsorbent for disulfides for removal of said disulfides from the gas.

Both inorganic and organic bases can serve as impregnating agents. Caustic soda and caustic potash solutions are preferred. Inorganic bases, and organic bases well suited for the process include alkanolamines, salts of amino acids, alkylene amines and alkylene polyamines, such as monoethanolamine, diethanolamine, triethanolamine, isopropanolamine, alkylenediamine, propylenediamine, diethylene triamine and dipropylenetriamine, etc.

It is expedient to keep the quantity and concentration of the alkaline impregnants constant by conventional measures, especially by the measured addition of liquid.

These substances can be used as full-strength liquids in cases where they exi t as liqu ds or they can be used in solution. They can also be continuously regenerated.

The oxidation (transformation of mercaptans) and/or adsorption (removal of oxidation products by adsorption with for example active charcoal) performed repeatedly, preferably in such a manner that the oxidation treatment is repeated several times before the adsorption is performed once or repeatedly. Lastly, disulfides to which the mercaptans are transformed can be won by steam distillation from the active charcoal bed.

The basis of the present invention is, as is indicated above, a chemical reaction in which the mercaptans are transformed to disulfides. In the impregnating liquid even in the case of inorganic bases the increase of the viscosity of the impregnating alkaline fluid is effected by the addition of swelling agents, as for example by the addition of starch solution, agar agar or dextrin. It is even practical to work with impregnating liquids having a viscosity at 20° C. of a maximum of 4° Engler. The preferred viscosity will depend on the system and is 1.2 to 2.0° E.

This process is also applicable to mercaptanous exhaust gases containing carbon dioxide. It has been found that carbon dioxide does not disturb the effectiveness of the conversion of mercaptans to disulfides.

Characteristic of this procedure is therefore the possibility of regenerating the catalyst by renewed impregnation with an alkylinely working substance; also the winning of disulfides instead of mercaptans, that is, new compounds; and further the avoiding of the irreversible inactivation of the catalyst by carbon dioxide. In contrast, in a washing process on a physical basis, no new compounds would develop, and instead the product washed out would be again released in the same form. The high transformation of mercaptans to disulfides, in part while avoiding the bonding of carbon dioxide is further described in the following examples.

EXAMPLE 1

250 cc. or 100 grams of pumice were impregnated with a 20% solution of NaOH of viscosity 1.290 E. (20° C.). The pumice thus treated was used as a catalyst bed. A column of dry active charcoal with a 1 liter charge was connected to its output. This apparatus was charged with 200 liters per hour of air which had been bubbled through a waste liquor containing mercaptans. Every 24 hours the decrease of mercaptans in the air was compensated by adding fresh waste liquor. The liquor was kept at a temperature of 70° C. The air contained 10 to 20 grams of mercaptan sulfur per cubic meter. In all cases, the mercaptans were reacted to more than 98%. The disulfides that had formed were driven out of the active charcoal column by steam distillation. After thirty days the transformation rate dropped under 95%. The experiment was discontinued.

EXAMPLE 2

In a manner similar to Example 1, the catalyst bed was impregnated with a 5% solution of NaOH to which 1% starch had been added. The solution had a viscosity of 1.377° E. at 20° C. An active charcoal column was connected to the exhaust of the catalyst bed as in Example 1. The experiment otherwise was performed in the same arrangement as in Example 1, with the same infeed of mercaptanous air. After 85 days, 99.7% of mercaptan sulfur was being transformed. The disulfides were driven out of the active charcoal from time to time.

EXAMPLE 3

250 cc. of pumice with a grain size of 3 to 6 mm., corresponding to 100 grams, were impregnated with a 5% solution of NaOH. The solution had a viscosity of 1.033° E. at 20° C. 80 cc. were adsorbed. An active charcoal column of 1 liter was connected out of the charcoal to the exhaust of the column. The columns were fed with exhaust air containing 10 to 20 grams of mercaptan sulfur per cubic meter and 4% carbon dioxide by volume. The rate of flow amounted to 200 liters per hour. At these concentrations, the transformation of the caustic soda solution to the carbonate was complete within about 1 hour. Still on the fourth day, 99.1 wt. percent of the mercaptans, by weight, were being transformed to disulfides. On the fifth day, the transformation rate dropped under 76.8%. The experiment was discontinued.

EXAMPLE 4

100 grams of pumice of the same kind as in Example 3 were impregnated with a 5% solution of NaOH to which 1% starch had been added. The solution had a viscosity of 1.377° E. at 20° C. The experiments otherwise were performed in the same arrangement as in Example 3, with the same infeed of marcaptanous air containing carbon dioxide. After 75 days, 99.7 wt. percent of the mercaptan sulfur was being transformed. The disulfides were driven out of the active charcoal column from time to time. The experiment was discontinued.

EXAMPLE 5

As in Example 3, 250 cc. of pumice with a grain size of 3 to 6 mm., corresponding to 100 grams, were impregnated with a 5% solution of diethanolamine in water. The solution had a viscosity of 1.027° E. at 20° C. 100 cubic centimeters of this solution were adsorbed by the pumice. A column containing active charcoal was connected to the discharge of the pumice column. Exhaust air containing 5 to 8 g. of mercaptan sulfur per cubic meter and 4 vol. percent of carbon dioxide was fed to the two columns. The rate of flow amounted to 25 liters per hour. On the 7th day, 99.4 wt. percent of mercaptans were still being transformed to disulfides. On the 8th day, the transformation fell to 89.7 wt. percent. After 14 days, it amounted to only 53.8 wt. percent. The experiment was discontinued.

EXAMPLE 6

To a 5% solution of diethanolamine in water was added 1% starch. The viscosity of this solution amounted to 1.371° E. at 20° C. This solution was applied to pumice with a grain size of 3 to 6 mm. in the same manner as in Example 5. 105 cc. of the solution were adsorbed in the pumice. The same procedure as described in Example 5 was used for the treatment of exhaust air containing mercaptans and carbon dioxide. After 60 days of operation the rate of transformation still amounted to 99.6% by weight. The disulfides that form are being driven out of the active charcoal column from time to time with steam.

While the invention has been described with respect to particular embodiments thereof, these embodiments are merely representative of the invention and do not serve to define the limits thereof.

What is claimed is:

1. In a process for removal of mercaptans from exhaust gas, wherein the exhaust gas in presence of free oxygen at a temperature of less than 100° C., is contacted with an adsorbent impregnated with a liquid mixture of an alkaline material for chemical conversion of mercaptans in the gas to disulfides, and the effluent gas is contacted with an adsorbent for disulfides for removal of said disulfides from the gas, the improvement which comprises including in said liquid, a thickening agent.

2. Process according to claim 1 wherein said alkaline material comprises an organic base.

3. Process according to claim 1, wherein said adsorbent impregnated with alkaline material is selected from the group consisting of charcoal, pumice, coke, clay, shards, bauxite, and bog iron ore.

4. Process according to claim 1 wherein the mercaptan containing gas to be treated is a carbon dioxide containing gas.

5. Process according to claim 1, wherein the viscosity of the liquid containing the thickening agent, is in excess of about 1.2° Engler at 20° C.

6. Process according to claim 1, wherein the viscosity of the liquid containing the thickening agent, is about 1.2 to 2.0° Engler at 20° C.

7. Process according to claim 3, wherein the thickening agent is starch.

8. Process according to claim 7, wherein the adsorbent for disulfides is charcoal.

References Cited

UNITED STATES PATENTS 2,110,240  3/1938  Roelen et al. _____ 23—2 X

FOREIGN PATENTS 721,506   1/1955  Great Britain.
1,144,692  3/1963  Germany.

OSCAR R. VERTIZ, *Primary Examiner.*

EARL C. THOMAS, *Examiner.*

UNITED STATES PATENT OFFICE
CERTIFICATE OF CORRECTION

Patent No. 3,391,988                      July 9, 1968

Herbert Friess

It is certified that error appears in the above identified patent and that said Letters Patent are hereby corrected as shown below:

Column 1, line 19, "absorption" should read -- adsorption --. Column 4, line 64, "clay, shards" should read -- clay shards --.

Signed and sealed this 16th day of December 1969.

(SEAL)
Attest:

Edward M. Fletcher, Jr.             WILLIAM E. SCHUYLER, JR.
Attesting Officer                      Commissioner of Patents